H. SIEDENTOPF.
COLLECTIVE SYSTEM.
APPLICATION FILED FEB. 13, 1911.

1,016,369.

Patented Feb. 6, 1912.

Witnesses:

Inventor:
Henry Siedentopf

UNITED STATES PATENT OFFICE.

HENRY SIEDENTOPF, OF JENA, GERMANY, ASSIGNOR TO THE FIRM OF CARL ZEISS, OF JENA, GERMANY.

COLLECTIVE SYSTEM.

1,016,369.    Specification of Letters Patent.    Patented Feb. 6, 1912.

Application filed February 13, 1911. Serial No. 608,334.

*To all whom it may concern:*

Be it known that I, HENRY SIEDENTOPF, a citizen of the German Empire, residing at Carl-Zeiss strasse, Jena, in the Grand Duchy of Saxe-Weimar, Germany, have invented a new and useful Collective System, of which the following is a specification.

The invention relates to collective systems consisting of two spherical reflecting zones, one convex and one concave, which are disposed behind each other in such a manner as corresponds to an angular opening zero on the side of the convex zone, *i. e.* so as to have on the side of the concave zone the best junction of rays, when the rays on the other side travel parallel to the axis. Systems of this kind are in use as microscope condensers for dark-ground illumination, and in two constructional forms of different origin. Both collect the rays in an annular cone, the angular opening of which extends from about 44° to 61°. In one of these well-known constructional forms the spherical radius of the concave zone is 1.6 times, in the other one 1.3 times as great as the spherical radius of the convex zone. The investigations, which led to the present invention, have shown, that with such a relative adjustment of the two zones, which causes the innermost and outermost rays to unite in the same axial point, the spherical aberration of the intermediate rays amounts in both constructional forms to about $\frac{1}{3}$ per cent. of the focal distance of the system. It may be remarked, that for the first constructional form this aberration appears as an under-correction, for the second as an over-correction.

The subject of the present invention is a constructional form of the system under consideration, in which the spherical radius of the concave surface is about 1.51 times as great as the spherical radius of the convex surface. In this case variations from this figure down to 1.45 and up to 1.57 may be allowed, as even with these extreme values there is a substantial improvement as compared with the constructional forms hitherto in use. With the value 1.51 such a marked improvement in the junction of the rays is obtained, that the spherical aberration does not amount to even the twentieth part of the former value. It appears partly as under-correction, partly as over-correction, so that the apex of the innermost and the outermost ray-cone surfaces also becomes the apex of a mean ray-cone surface.

Figure 1:
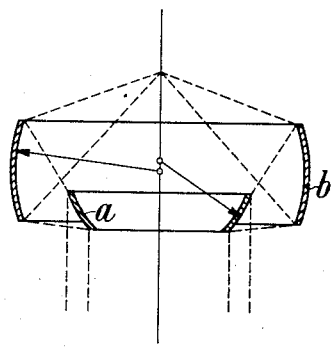
Figure 2:
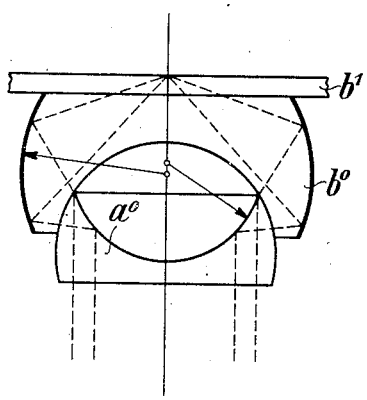

In the annexed drawing: Figure 1 is a section through a collective system constructed according to the invention. Fig. 2 is a section through another constructional form of the same system.

In Fig. 1 thin mirrors $a$ and $b$ are made use of, which are rigidly connected by some means. In Fig. 2, in which the dimensions of the effective reflecting zones are the same as in Fig. 1, two lenses $a^0$ and $b^0$, which are in contact with each other in a spherical surface serve as carriers of these zones, $a^0$ having a totally reflecting, and $b^0$ a silvered reflecting surface. The biconvex hollow space between the two lenses, being optically inoperative, may be left empty or filled up with any suitable substance. As the system is intended to represent a microscope condenser, the annular ray-cone in leaving the reflecting lens $b^0$ enters an object slide $b^1$.

I claim:

1. Collective system consisting of two reflecting bodies, one of which presents a convex and the other a concave reflecting zone and which are disposed the one behind the other with an angular opening zero on the side of the mirror having the convex zone, the spherical radius of the concave zone being at least 1.45 and at most 1.57 times as great as the spherical radius of the convex zone.

2. Collective system consisting of two lenses, one of which presents a convex totally reflecting zone and the other a concave silvered reflecting zone and which are disposed the one behind the other with an angular opening zero on the side of the lens having the convex zone, the spherical radius of the concave zone being at least 1.45 and at most 1.57 times as great as the spherical radius of the convex zone.

HENRY SIEDENTOPF.

Witnesses:
PAUL KRÜGER,
RICHARD HAHN.